April 30, 1963 L. HASE ET AL 3,087,404
PHOTOGRAPHIC METHOD
Filed Dec. 20, 1957 7 Sheets-Sheet 1

INVENTORS
LEOPOLD HASE
DONALD F. OTHMER
BY Charles J. Elderkin
ATTORNEY

April 30, 1963 L. HASE ET AL 3,087,404
PHOTOGRAPHIC METHOD
Filed Dec. 20, 1957 7 Sheets-Sheet 2

INVENTORS
LEOPOLD HASE
DONALD F. OTHMER
BY Charles J. Elderkin
ATTORNEY

April 30, 1963   L. HASE ET AL   3,087,404
PHOTOGRAPHIC METHOD
Filed Dec. 20, 1957   7 Sheets-Sheet 5

INVENTORS
LEOPOLD HASE
DONALD F. OTHMER
BY Charles J. Elderkin
ATTORNEY

3,087,404
PHOTOGRAPHIC METHOD
Leopold Hase, Brooklyn, N.Y., and Donald F. Othmer, Coudersport, Pa., assignors to Polytechnic Institute of Brooklyn, Brooklyn, N.Y., a corporation of New York
Filed Dec. 20, 1957, Ser. No. 704,031
7 Claims. (Cl. 95—76)

This invention relates to methods and apparatus for photographic reproduction and more particularly to a novel method for reproducing three-dimensional images by photographic contact printing. The invention is adapted to reproduction of relief maps and duplication of other reliefs of utilitarian and ornamental nature.

Photographic reproduction of three-dimensional intelligence, and particularly the reproduction of relief maps, has heretofore been accomplished by various projection methods. Thus, a non-photosensitive model of the relief intelligence is usually prepared by well-known procedures and a photosensitive film is molded to the relief surface of the model, as by the method disclosed in U.S. Patent 2,734,825, issued February 14, 1956, to Morgan, with the apparatus described in U.S. Patent 2,493,439, issued January 3, 1950, to Braund. The image to be reproduced is then projected, from a two-dimensional negative, onto the molded photosensitive sheet. Such a method of reproducing relief intelligence has numerous disadvantages. First, if the usual projection methods are employed, the transposition from the two-dimensional image of the negative to the three-dimensional surface of the positive involves considerable distortion of the image, with areas of the positive image not being accurately registered, both horizontally and vertically, and also results in a considerable distortion in scale. The same difficulties arise, though perhaps to a lesser degree, when special orthographic projection methods are employed. If the image to be reproduced in relief involves vertical, near-vertical or undercut image portions (as in the case of steep slopes, cliffs and the like when a relief map is being made), projection methods are incapable of providing a satisfactory image in such portions on the relief positive. Further, the projection methods all have the distinct disadvantage that a very considerable time is usually required to produce even one three-dimensional positive.

The present invention provides a method and apparatus for accomplishing, by means of photographic contact printing, the rapid reproduction of three-dimensional photographic images. A particular advantage of the invention is that the three-dimensional image obtained is in accurate registry, both horizontally and vertically. Thus, the invention is particularly advantageous in the production of relief maps and the like requiring accurate registration.

Insofar as we are aware, the present invention provides the first successful reproduction of relief intelligence by means of photographic contact printing, as distinguished from photographic projection.

A particular object of the invention is to provide a novel method and apparatus for obtaining a photographic contact print in relief from a corresponding photographic negative which is also in relief. In this connection, the invention provides a method, and an apparatus for carrying out the same, for maintaining a photosensitive three-dimensional element and a complementary three-dimensional negative in intimate face-to-face contact during exposure of the photosensitive surface through the negative.

A further object of the invention is to provide a unitary apparatus for carrying out relief contact printing, such apparatus requiring a minimum of skill and attention on the part of the operator and being capable of operation at a rate of speed comparable to conventional two-dimension contact printing devices.

In order that the manner in which these and other objects of the invention are achieved can be understood in detail, reference is had to the accompanying drawings, which form a part of this specification and wherein.

The thickness of the photosensitive elements being exaggerated for clarity in FIGS. 2-6.

Broadly stated, the method of the present invention involves the preparation of two three-dimensional photographic elements, one presenting a photosensitive relief surface which will become the positive, and the other constituting a photographic negative in relief. With the photosensitive element positively supported, the negative is brought into intimate face-to-face contact therewith, of course with accurate registry as to the relief of the two elements, and the photosensitive surface is photographically exposed through the negative.

Advantageously, both of the three-dimensional photographic elements are prepared from heat-moldable photosensitive films of the general type disclosed in the aforementioned Morgan patent, best results being obtained when vacuum forming procedures are used. Instead of employing vacuum-forming procedures, sheet-like photographic elements may be prepared by any suitable molding method. Alternatively, either or both of the three-dimensional photographic elements can be formed by casting or molding from photosensitive resinous compositions or from photosensitive glass, it then being possible to employ elements which are self-supporting and have substantial thickness. Similarly, either or both of the elements can be cast or molded from a non-photosensitive composition and the photosensitive surface then applied to the relief face of the element.

When a moldable film is employed, it is necessary to prepare molds presenting a three-dimensional face against which the film is molded, the configuration of the mold face being an accurate copy of the relief intelligence to be reproduced. Thus, we prepare two complementary molds 1 and 2, illustrated in FIG. 1 as having relief faces 3 and 4, respectively, of a configuration which might be encountered in the reproduction of a relief map. Mold 1 is a male mold, having projections 5 and depressions 6 representing hills and valleys, respectively. Mold 2 is a female mold, having depressions 5a matching the projections 5, and projections 6a matching the depressions 6.

Figure 1:
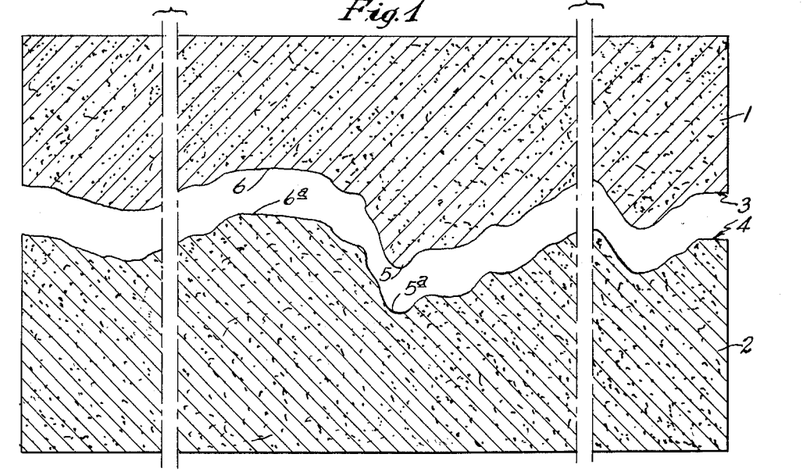
FIG. 1 is a diagrammatic sectional view illustrating complementary mold members employed to produce three-dimensional photographic elements in accordance with the invention.

To produce the complementary molds 1 and 2, a single master mold is made by conventional techniques from any suitable material, usually a plaster composition. This master mold may be either male or female. Then, both molds 1 and 2 are made from the single master mold. If the master is a female mold, the male mold 1 is advantageously made by first producing from the master a cast, flexible intermediate male mold, using a plastisol or equivalent composition, for example, as the casting material. Then, a second intermediate mold is cast from the first intermediate mold. The second intermediate will be a female mold and is preferably prepared from a plaster-starch composition, so as to be disintegratable. The male mold 1 is then prepared by casting, from the second intermediate mold, using a composition comprising a resin binder and sand as a filler.

The female mold 2 is prepared in the same manner, except that an additional flexible intermediate mold, which will of course be a female mold, is cast from the first intermediate. The disintegratable mold is then prepared from this additional flexible intermediate, so that the disintegratable plaster-starch mold is now a male and mold 2, cast therefrom, will be a female. In all cases, the composition employed for producing molds 1 and 2 is advantageously one which exhibits only negligible dimensional changes with variations in temperature.

If the molds 1 and 2 are to be employed to shape positive and negative films by vacuum forming, then the molds 1 and 2 are made porous. This can be done by drilling a multiplicity of fine holes completely through the mold and extending from the relief face to the base thereof, as seen, for example, in FIG. 5. Alternatively, the molds can be formed of a composition which provides a uniformly porous product.

Figure 2:
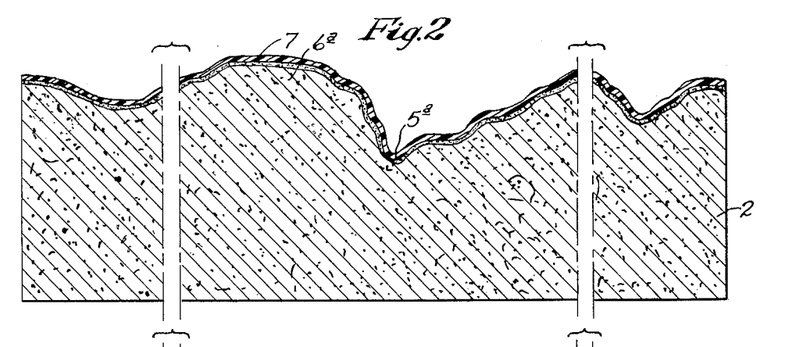
FIG. 2 illustrates the manner in which a photosensitive sheet of film, to become the positive, is molded to three-dimensional form in accordance with the invention.
Figure 3:
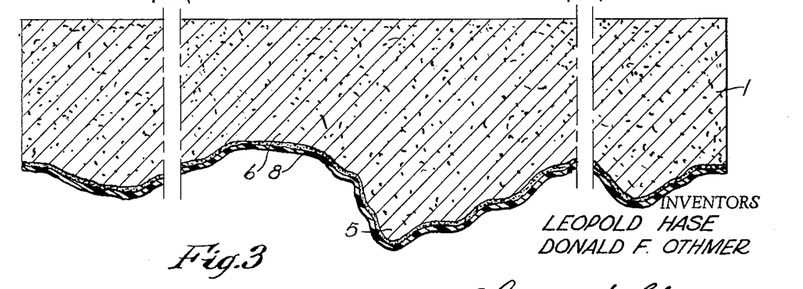
FIG. 3 is a diagrammatic view, similar to FIG. 2, but illustrating the manner in which the photosensitive sheet which is to become the relief negative is molded to three-dimensional form.

The moldable photosensitive film 7 which is to become the positive is prepared using the female mold 2. The film 7 is placed on the mold emulsion face toward the mold and molding then carried out, as described in the Morgan patent, at about 700° F. with a period of 13–17 seconds. The photosensitive negative film 8 is prepared using the male mold 1, in the same manner just described, film 8 being placed with its emulsion side facing mold 1. The films 7, 8 will now nest precisely in emulsion-to-emulsion contact.

In order that the actual contact printing step can be carried out with best results for the usual commercial purposes, it is necessary that the films 7, 8 be in uniform and intimate face-to-face contact during exposure. In all embodiments of the method invention, use can be made of a suitable support for the sheets 7, 8 during exposure. In certain embodiments, it is also necessary that one of the sheets 7, 8 be porous.

To provide support for the sheets 7, 8 during printing, we can prepare a relief model substantially identical to one of the molds 1, 2. Advantageously, however, we employ one of the molds 1, 2 as the supporting means.

Thus if the supporting means is to contact the back of the negative, the support can be female mold 2 while, if the supporting means is to contact the back of the sheet which is to become the positive, the support can be male mold 1.

In this connection, it should be noted that exposure can be made with the light passing through the support or with the light coming from the opposite direction. In the former case, the support must be transparent, or at least translucent, while it may be opaque in the latter case. When a transparent support is required, the support is, for example, cast from a suitable acrylate resin composition providing the desired optical properties.

Figure 4:
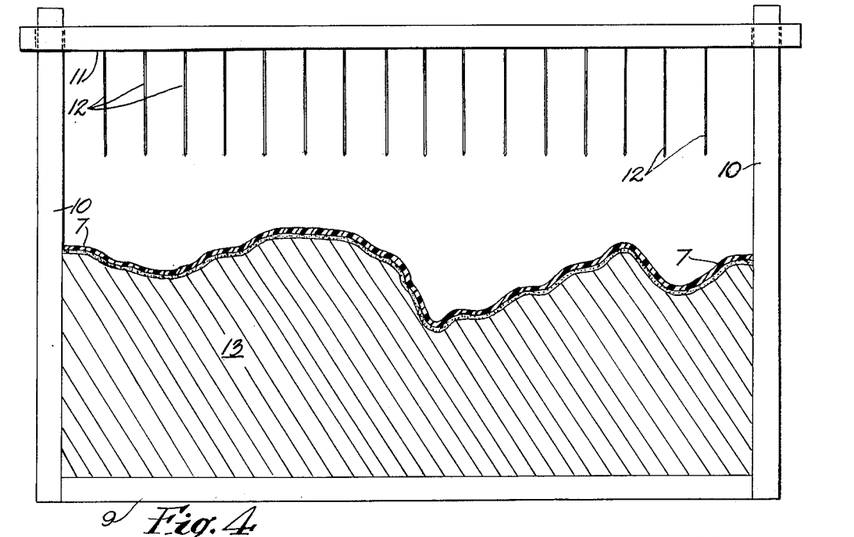
FIG. 4 is an elevational view, partly in vertical section, illustrating the manner in which a photographic relief element, either negative or positive, is perforated in accordance with one embodiment of the invention.

When it is necessary that one of the molded three-dimentional films be porous, this may be accomplished, for example, by perforating the film in the manner illustrated in FIG. 4, where perforation of the film 7, to become the positive, is shown. Perforation is accomplished by means of an apparatus including a base 9 and upright guide bars 10. Slidable on the guide bars 10 is a frame 11 carrying a plurality of fine, spaced, parallel needles 12. The film 7 is supported by a flexible backing 13 disposed on base 9. To perforate the film, frame 11 is actuated downwardly until the needles extend through the film into the backing 13.

Preliminary to accomplishing contact printing, it is of course necessary to accurately establish the negative image on film 8. When the invention is being employed to reproduce a relief map, for example, the negative will usually be exposed by projection.

The negative film is exposed in such manner as to establish thereon a latent image which is relatively free of scale distortions and wherein all portions are substantially perfectly registered with respect to the configuration of the relief. At this point, it should be noted that no serious disadvantage arises because of the necessity of spending a considerable amount of time in preparing an accurate negative, since the one negative will be employed to produce many positives. The accurate exposure of the negative can be accomplished by carefully carried out orthographic projection from a two-dimensional negative. Since this negative will be employed to produce many positives, it is practical to employ special projecting techniques to take care of the problem of establishing an image, in its proper scale and accurate location, on areas of sharp relief, such as steep slopes and cliffs in the case of relief maps. Were the negative to be the only image obtained, as in the prior-art methods of photographically reproducing relief surfaces, such care could not be justified.

Figure 5:
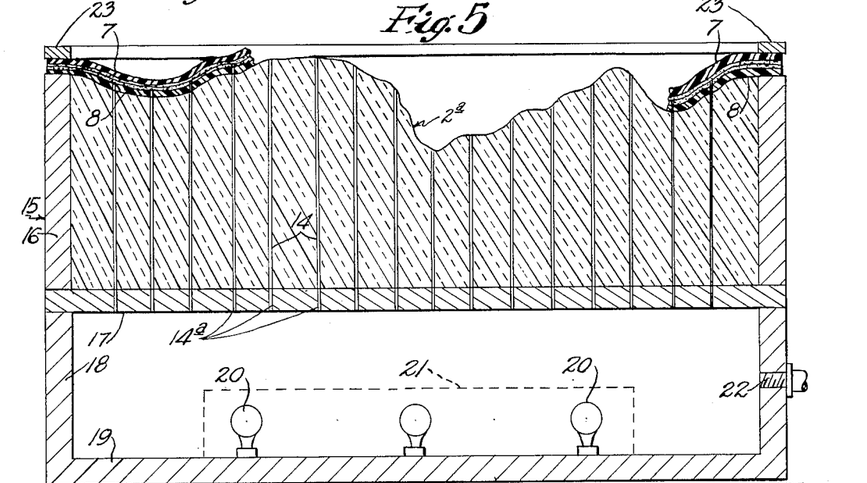
FIG. 5 is an elevational view, partly in vertical section, of a highly simplified apparatus employed in three-dimensional contact printing in accordance with one embodiment of the invention.

One manner of carrying out the actual exposure of the positive element 7 through the negative 8 is illustrated in FIG. 5. In this embodiment of the method and apparatus, a female mold 2a, employed to shape the photosensitive sheet 7, is employed as the support. Further, the support 2a is made transparent in this case and thus may be of a cast methyl methacrylate composition, for example. The support is provided with a plurality of piercings 14 extending from the relief surface through the body of the support to the base surface thereof. The support 2a is disposed within a box 15 of wood, metal, or other substantially non-porous material, the box 15 having side walls 16 arranged to contact the side faces of the support, the bottom of the box being closed by a transparent plate 17 lying in face-to-face contact with the back surface of the support and provided with apertures 14a registering with the piercings 14. Below the box 15, there is provided a second enclosure having side walls 18 engaging the plate 17, the bottom of this second enclosure being closed by a bottom wall 19. Mounted in any suitable fashion on the bottom wall 19 are a plurality of light sources 20 which may be advantageously closed by a transparent cover 21. The side walls of the bottom enclosure are secured to the plate 17 in fluid-tight relation, so that the box 15, the plate 17 and the lower enclosure combine to form a structure the interior of which is sealed against entry or escape of fluid. Further, the lower enclosure is provided with a fitting 22 to be connected to evacuating means (not shown), as hereinafter explained with reference to FIG. 7.

The negative 8, molded, exposed and processed, is then perforated in the manner hereinbefore described with reference to FIG. 4. The completed porous negative 8 is placed on the relief surface of the female mold 2$^a$, with the emulsion side of the negative facing upwardly, it being understood that an accurate image has been established in the negative. The photosensitive film 7 is then placed in registry on top of the negative, emulsion face down to contact the emulsion face of the negative. It will be noted that in this embodiment, the films 7, 8 are of the same size, including edge portions which overlie the top edges of the side walls 16 of the box. A clamping frame 23, having the same configuration as the top of the box 15, is lowered into place to firmly press the edge portions of the films against the top edges of the side walls of the box.

The interior of the lower enclosure is now placed in communication with the evacuating means. This results in removal of the air from the interior of the box 15 and from beneath the negative 8. Since the negative is porous, air is also evacuated from between the two films. Accordingly, the photosensitive film 7 is forced into uniform and intimate contact with the emulsion side of the negative. The light sources 20 are now actuated to expose the photosensitive "positive" sheet 7 through the negative, the light traversing the plate 17 and the transparent mold 2$^a$. The clamping frame 23 is then removed and the exposed positive removed for development. Meanwhile, a second identical molded photosensitive positive film is placed upon the negative and the process repeated.

Figure 5A:
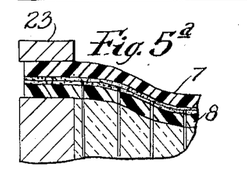
FIG. 5a is a detailed sectional view through a portion of the apparatus of FIG. 5, on a larger scale than FIG. 5, illustrating one advantageous relationship between the positive and negative films.
Figure 5B:
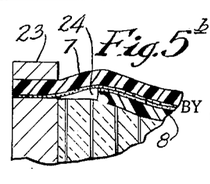
FIG. 5b is a view similar to FIG. 5a, but showing a modified arrangement.

The perforations in the negative are uniformly distributed throughout the extent thereof, so that perforations are provided even adjacent the edge of the box 15, as illustrated in FIG. 5$^a$. The necessity for perforating the negative can be avoided by making the negative film of smaller size than the photosensitive film 7 which is to be exposed as the positive. Thus, the edges of the negative 8 can be spaced inwardly from the edges of the box 15, as indicated at 24 in FIG. 5$^b$. With the mold 2$^a$ having piercings which communicate with the relief face of the mold in the space between the edges of the negative and the side walls of the box, it will be understood that evacuation of the air between the two films is accomplished via the space around the edges of the negative.

Figure 6:
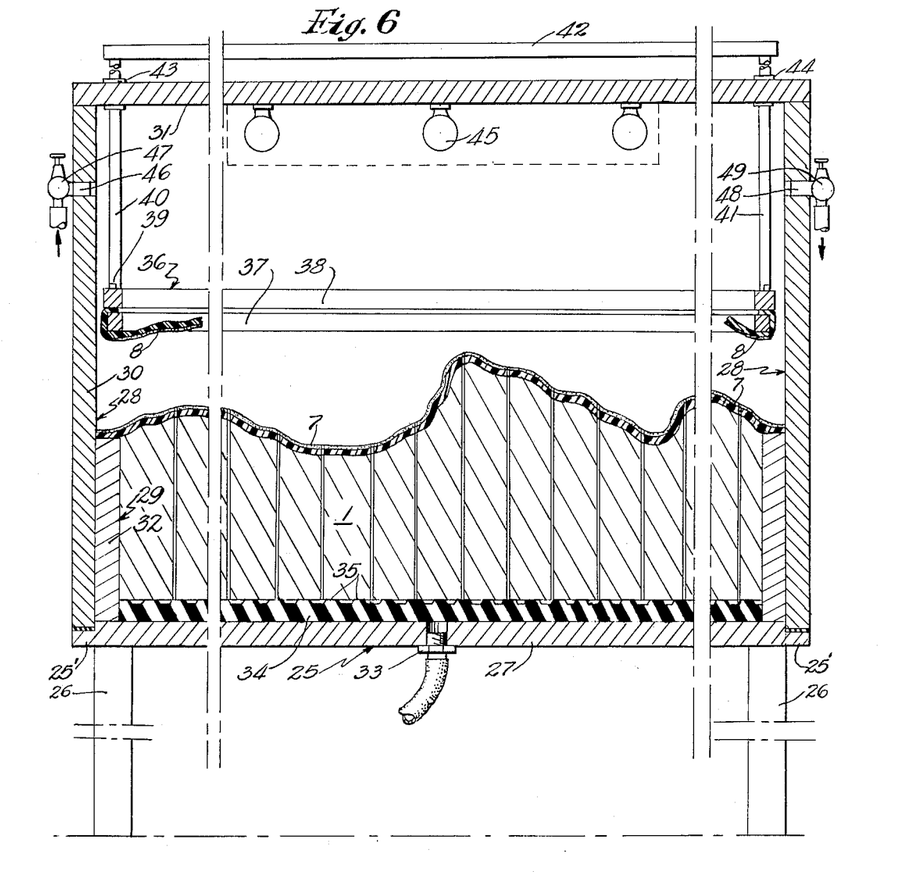
FIG. 6 is a view similar to FIG. 5 but illustrating an apparatus for carrying out other method embodiments of the invention.

FIG. 6 discloses an embodiment of the invention wherein the light for exposure is directed from a point above the support, so that it is not necessary for the light to traverse the support. The apparatus employed in this embodiment of the invention comprises a supporting table 25 having legs 26 and a top 27, the top being of stepped configuration, as shown, so as to form a closure member for both an outer, fluid-tight box 28 and an inner support box 29. With this construction, the box 28 comprises only side walls 30 and a top 31, and the support container consists only of the side walls 32. Side walls 32 can define an area slightly smaller than the plan dimensions of molds 1, 2, so that the edges of elements 7, 8 will overlap the tops of side walls 32. Alternatively, the elements 7, 8 can be made of larger extent than the molds. In order that the operator can have access to the interior of box 28, the box is made removable, side walls 30 slidably embracing walls 32 and seating against a gasket supported by ledge 25'.

The top 27 is provided with a central hole in which is mounted a fitting 33 for connection to a suitable evacuating means (not shown). Overlying the top 27 in the area enclosed by side walls 32 is a mat 34, advantageously of rubber or other resilient material, provided with a central opening in registry with the fitting 33. The bottom surface of the mat 34 is a plane surface, while the top surface is interrupted. Thus, the top portion of the mat 34 may consist of a plurality of spaced, frustroconical projections 35. The male mold 1, employed to shape negative film 8, is employed as the support in this embodiment and is provided with piercings as hereinbefore described.

The photosensitive film 7, which is to be exposed as the positive and which has been shaped on mold 2 to the desired relief configuration, is disposed on the porous mold 1, emulsion side up, and with its edge portions overlying the side walls 32 of the support box. In this embodiment, the photosensitive film 7 is perforated as hereinbefore described with reference to FIGS. 4 and 5$^a$, perforation having been done prior to introduction of the film 7 into the apparatus of FIG. 6.

As the negative, this embodiment employs a film negative shaped on mold 1 as hereinbefore described, the negative being properly exposed and fully developed before it is introduced into the apparatus of FIG. 6.

Here, the negative is mounted on a carrier 36 comprising framing elements 37 and 38 between which edge portions of the negative are clamped. As shown, the negative extends beyond the lower framing member 37, thence upwardly and between the members 37 and 38. Members 37, 38 are urged together to clamp the negative by screws 39 or other suitable means.

The carrier 36 is mounted on two parallel shafts 40, 41 extending through the top of outer box 28, the upper ends of shafts 40, 41 being connected to provide an operating handle 42. To maintain outer box 28 fluid-tight, shafts 40, 41 pass respectively through stuffing boxes 43, 44.

The apparatus is first opened by removing box 28, and the film negative is then clamped to carrier 36 in such manner as to register with film 7. Box 28 is replaced, and carrier 36 moved downwardly until the negative 8 comes into face-to-face contact with the film 7. At this point, it is to be noted that the lower framing member 37 of the carrier 36 presses edge portions of the negative downwardly against film 7, so that the edge portions of the films 7 and 8 are clamped firmly together between the carrier and the tops of side walls 32.

The evacuating means is now placed in operation, evacuating all of the space above top 27 and below the negative, and thus forcing the photosensitive film 7 into intimate contact with the support and the negative 8 into intimate contact with the film 7. While such condition is maintained, a plurality of light sources 45, mounted in any suitable manner above the negative, are actuated to expose the photosensitive film 7.

The outer box 28 is provided with a fitting 46 connected to an air inlet valve illustrated diagrammatically at 47, so that the valve 47 can be manually or otherwise actuated either to place the interior of the box in communication with the atmosphere or a positive pressure source, or to prevent such communication. The box 28 is also provided with a fitting 48 which is suitably connected, via valve 49, to a suitable evacuating means.

Instead of proceeding in the manner just described, the method may be modified as follows. With the support in place, the negative is placed directly upon the relief surface of the support and proper registry obtained by manual adjustment. The clamping frame is then lowered and the negative secured to the clamping frame in any suitable fashion, so that registry will be assured throughout the operation. The clamping frame, with the negative secured thereto, is now raised, the photosensitive positive film 7 is placed in registry on the support, emulsion side up, valve 47 is closed, and the entire apparatus evacuated via fittings 33 and 46. The clamping frame 36 is now lowered until the negative 8 is in contact with the positive film 7. When the enclosure has been evacuated to the desired degree, valve 49 is closed and valve 47 is opened, placing the box 28 in communication with the atmosphere. Atmospheric pressure then forces the negative into intimate contact with the positive film 7, and exposure of the latter is carried out as just described. In this particular modification, a full sized positive can be used.

Instead of employing a perforated, or otherwise porous positive film in this embodiment of the invention, the positive can be made of smaller size than the negative, in a manner which will be clear from FIG. 5$^b$. It will also be clear that, instead of exposing from above the support, the exposure can be made from below the support in the manner described with reference to FIG. 5.

Figure 9:
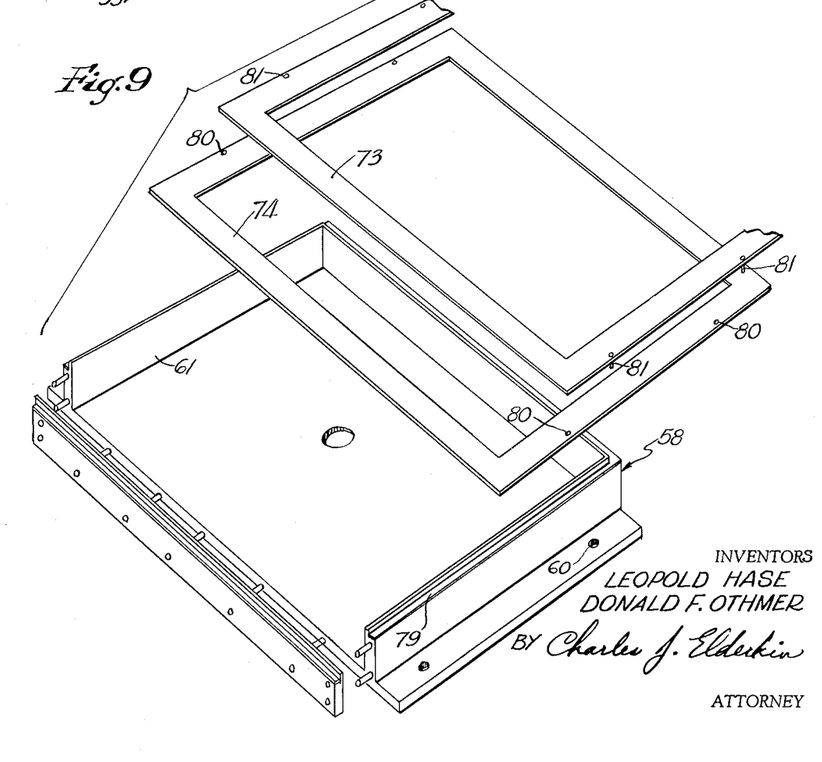
FIG. 9 is an exploded view, in perspective, illustrating the support box and film negative clamping means of FIG. 7.
Figure 10:
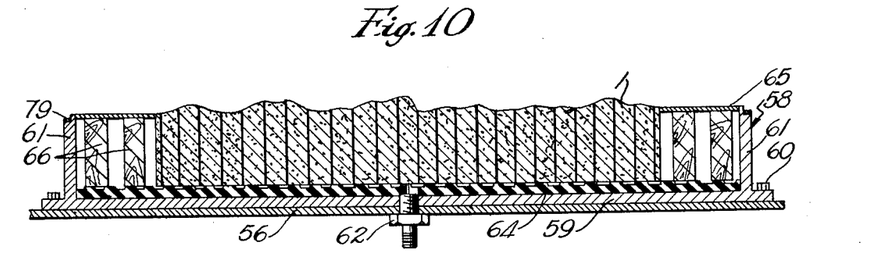
FIG. 10 is a vertical sectional view taken on the line 10—10, FIG. 8, this view being on a larger scale than FIG. 8.

FIGS. 7–13 illustrate a typical commercial embodiment of the apparatus of the invention. This embodiment comprises a frame 55 having a top plate 56 supported by upper horizontal framing elements 57. Mounted on the upper surface of plate 56 is a support box 58. As best seen in FIG. 10, the support box 58 comprises a bottom wall 59, secured to plate 56 as by means of bolts 60, and upright side walls 61.

Figure 7:
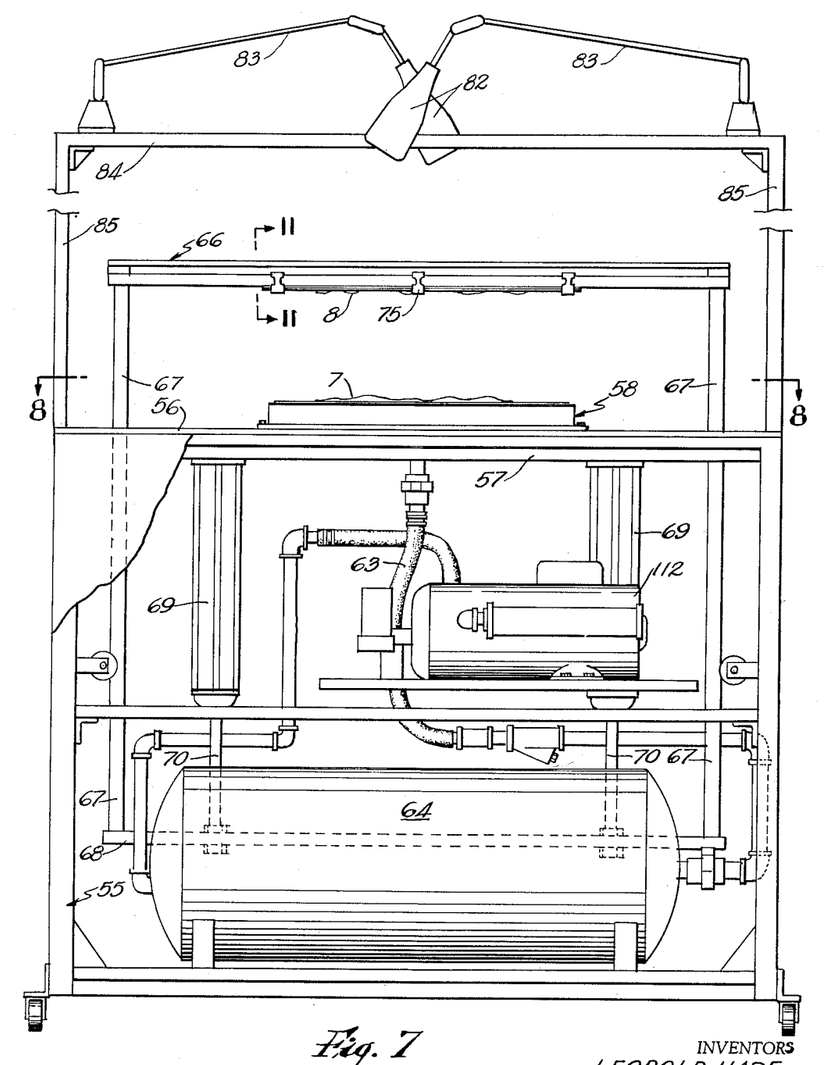
FIG. 7 is an elevational view of another embodiment of relief contact printing apparatus capable of carrying out the method of the present invention, portions of the housing of said apparatus being deleted for clarity.
Figure 8:
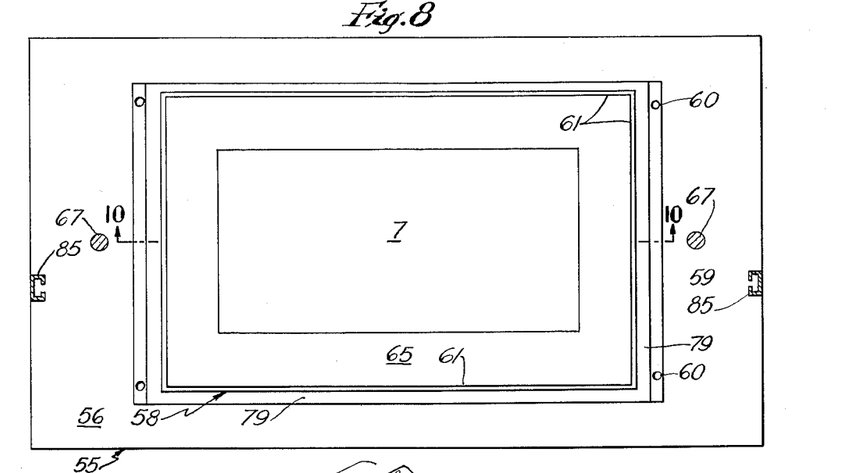
FIG. 8 is a transverse sectional view, with some parts shown in plan, taken on the line 8—8, FIG. 7.

The plate 56 and bottom wall 59 are provided with aligned openings in which is engaged a fitting 62 connected by conduit 63 to a vacuum tank 64, FIG. 7, the tank being mounted in any suitable fashion on frame 55. Disposed on top of bottom wall 59 is a rubber mat 64, FIG. 10, having an opening aligned with fitting 62. The upper surface of mat 64 is interrupted, comprising spaced elements on which rests a film support, in this case the porous male mold 1. The space between support 1 and side walls 61 is bridged by a framing sheet 65 supported by spacers 66. Sheet 65 lies flush with the top edges of side walls 61.

The photosensitive film 7, to become the positive, is placed, emulsion side up, on the relief surface of support 1.

This apparatus embodiment of the invention employs a movable negative carrier, indicated generally at 66, FIG. 7, and mounted on parallel shafts 67. Shafts 67 extend downwardly through suitable guides in the top of the frame and are joined at their bottom ends by a cross-head 68. Fixed in any suitable fashion to upper framing members 57 are two spaced pneumatic motors 69 disposed parallel to shafts 67, cylinders 69 being equipped with pistons and with piston rods 70 secured to cross-head 68. Thus, simultaneous operation of the pneumatic motors 69 is effective to move shafts 67 upwardly or downwardly, as the case may be, so raising or lowering the negative carrier 66 with respect to box 58.

Figure 11:
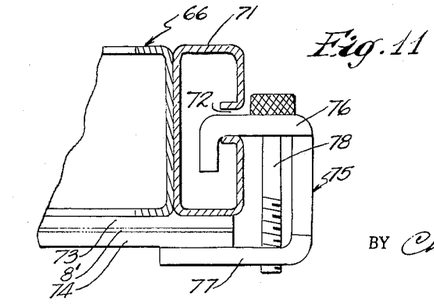
FIG. 11 is a detailed vertical sectional view taken on line 11—11, FIG. 7, with parts shown in elevation, and on a larger scale than FIG. 7.

As will be understood from FIGS. 7 and 11, negative carrier 66 comprises a rectangular frame, the outer framing elements 71, FIG. 11, of which are tubular, presenting outwardly directed slot-like openings 72. The negative carrier also includes an upper rectangular clamping plate 73 and a lower rectangular clamping plate 74, plates 73 and 74 being in the nature of framing elements defining an open area larger (or frame size or smaller) than the negative 8. The negative 8 is mounted on a mask 8', an edge portion of which is seen in FIG. 11, and the mask is disposed between plates 73 and 74, the assembly then being secured to the carrier 66 by a plurality of clamps 75. As illustrated in FIG. 11, each clamp 75 includes an upper angle member 76 extending into one of the slots 72, and a lower angle member 77 having an arm extending horizontally along the bottom of plate 74. The assembly of plates 73, 74 and mask 8' is thus clamped between the horizontally extending arms of members 77 and the main frame of carrier 66, as seen in FIG. 11, clamping pressure being supplied by screws 78.

As seen in FIGS. 9 and 10, the outer portions of the tops of side walls 61 of support box 58 are cut away to provide a continuous, horizontally disposed, rectangular shoulder against which is seated a gasket 79. The inner dimensions of plate 74 are such that plate 74 can embrace the tops of side walls 61, seating against gasket 79. When in this position, plate 74 is disposed with its top surface flush with the top edges of side walls 61 and with framing sheet 65.

Lower clamping plate 74 is provided with a plurality of registration apertures 80, FIG. 9. Upper plate 73 is similarly provided with pins 81 disposed to engage apertures 80 when the two plates are placed together. To mount the negative, plate 74 is first seated against gasket 79. With the photo-sensitive film 7 in place on support 1, in proper registry therewith, the negative 8, with mask 8' affixed thereto, is registered by hand on film 7. The edge portions of mask 8' overlap plate 74 and are suitably secured thereto, as by means of adhesive tape. Upper plate 73 is then lowered into place, with pins 81 engaging in apertures 80. Carrier 66 is then lowered and, with lower plate 74 still seated on the support box, the assembly of plates 73 and 74 and the negative is rigidly attached to carrier 66 by clamps 75. Proper registry of the negative 8 with photo-sensitive film 7 is thus assured.

Exposure is carried out by means of conventional electric lamps 82 mounted, by means of universally adjustable mounts 83, on a horizontal cross bar 84 supported, above the uppermost position of the carrier 66, by uprights 85.

In general, this embodiment of the apparatus functions as follows: With the negative properly mounted on carrier 66 and with the film 7 in place on support 1 in box 58, carrier 66 is lowered until plate 74 seats against gasket 79. Box 58 is then evacuated. Support 1 and film 7 being porous, and negative 8 constituting the top of the box, the negative and the film 7 are urged into intimate face-to-face contact as a result of such evacuation. In this connection it is to be noted that the mask 8' is sufficiently flexible to allow some movement of the negative in directions normal to the relief face of support 1. Support 1 of course prevents movement of the film 7. When the negative and the film 7 are properly nested, and while the box 58 is still evacuated, lamps 82 are energized, for the proper time period, to expose the film 7. Air at atmospheric pressure is then re-admitted to box 58, freeing negative 8 from the now-exposed film 7, carrier 66 is elevated by operation of pneumatic motors 69, and the exposed film 7 then removed and developed. The apparatus is constructed to accomplish all of the foregoing functions automatically, except for the necessary manual handling of the films 7, 8, as will now be explained with reference to FIGS. 12 and 13.

Figure 12:
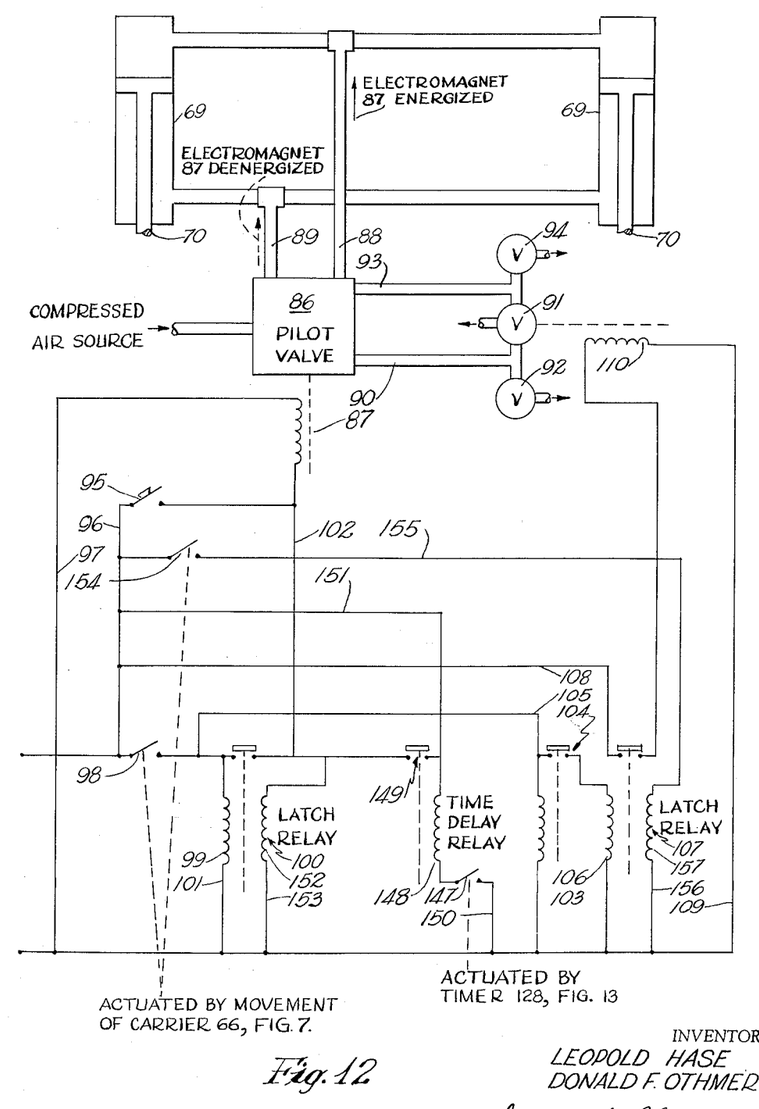
FIG. 12 is a schematic diagram of a pneumatic power system employed in the apparatus shown in FIG. 7.

As seen in FIG. 12, air under pressure, as from a conventional compressed air system, is supplied to drive pneumatic motors 69 via a pilot control valve 86 actuated by an electromagnet 87. Valve 86 is so constructed that, when electromagnet 87 is energized, air under pressure is supplied to motors 69, above the pistons thereof, via conduit 88. With electromagnet de-energized, air is supplied, below the pistons, via conduit 89. When motors 69 actuate downwardly, to lower carrier 66, exhaust air from the motors passes from the motors via conduit 89, valve 86, conduit 90 and, for most of the stroke, both a main exhaust valve 91 and a cushioning exhaust valve 92. On the upstroke, exhaust is via conduit 88, valve 86, conduit 93 and, for most of the stroke, both main exhaust valve 91 and cushioning valve 94.

Operation of the device will be explained assuming that carrier 66 is initially raised. The cycle is started by closing a manual switch 95, completing a circuit to electromagnet 87 via conductors 96, 97. Resulting energization of the electromagnet causes downward actuation of motors 69, lowering frame 66. As frame 66 descends, part of the supporting means for the frame mechanically actuates position switch 98, closing the same to complete a circuit to winding 99 of latch relay 100, via conductor 101. Energization of winding 99 causes the contacts of relay 100 to be latched in closed position, completing a circuit to electromagnet 87 via conductor 102 and thereby allowing manual switch 95 to be released with electromagnet 87 remaining energized. Actuation of position switch 98 also completes a circuit to winding 103 of relay 104 via conductor 105, resulting in actuation of relay 104 to closed position. As a result of actuation of relay 104, winding 106 of latch relay 107 is energized, latching the contacts of relay 107 in closed position, via conductors 108 and 109. Such actuation of relay 107 completes a circuit to energize electromagnet 110 of main exhaust valve 91. Such actuation causes valve 91 to deliver the full exhaust to cushioning valve 92. Valve 92 is a needle valve allowing only a reduced flow of the exhaust air, thus slowing the movement of the pistons of motors 69 at the end of the stroke.

It will be clear that, through the control means so far described, carrier 66 has been moved from a raised position relatively rapidly to a lowered position and then, through the action of the cushioning valve 92, has been more slowly brought to its lowermost position. In this position, the carrier 66 is seated with lower clamping plate 74 engaging gasket 79 on support box 58. The apparatus is now in position such that the support box can be evacuated, it being understood that negative 8 overlies and lightly engages the positive film 7 on support 1 in registry therewith.

Downward travel of the carrier 66 also closes a position switch 111, FIG. 13, controlling the evacuation system, resulting in evacuation of the support box 58 as will now be described. The interior of box 58 is connected, via fitting 62 and conduit 63, to vacuum surge tank 64. Tank 64 is maintained evacuated by vacuum pump 112 driven by motor 113, the latter being controlled in response to tank pressure by pressure-responsive switch 114. Between the box 58 and vacuum tank 64, there is provided in conduit 63 a normally closed valve 115 which can be actuated to open position by energization of electromagnet 116. Between box 58 and valve 115, conduit 63 is connected to the atmosphere via conduit 117 and normally closed valve 118, the latter being actuatable to open position by energization of electromagnet 119.

At the time position switch 111 is closed by descent of carrier 66, both valves 115 and 118 are closed. Actuation of switch 111 energizes winding 120 of latch relay 121, via conductors 122, 123, latching the contacts of relay 121 closed. A circuit is thus completed to energize electromagnet 116 of valve 115 via conductors 123, 125, 126 and 124. Valve 115 is thus opened, causing air to be evacuated from box 58 into vacuum surge tank 64. Positive film 7 and negative 8 are thus brought into intimate, uniform contact, the interior of box 58 being evacuated and positive atmospheric pressure being of course applied to negative 8.

Closing of switch 111 also energizes the driving motor 127 of a manually settable timer 128 via conductors 129 and 130, switch 131 being in closed position. Simultaneously, actuating winding 132 of a time delay relay 133 is energized, as a result of closing of position switch 111, via conductors 129 and 134. After a predetermined time delay of, say, 5 seconds, relay 133 closes, completing a circuit to energize winding 135, of electromagnetically actuated clutch 136 in timer 128, via conductors 137 and 138. Motor 127 having come up to full speed during such delay, timer 128 functions to control the time of exposure of film 7, the duration of evacuation of box 58, and the time at which the upward travel of carrier 66 commences.

Lamps 82 are energized by a circuit comprising conductors 137 and 139, normally closed switch 140 and conductor 141. Accordingly, lamps 82 are energized when time delay relay 133 actuates. The end of the exposure is determined by switch 140, actuated to open position by operation of timer 128.

When the exposure has thus been completed, timer 128 operates to close a normally open switch 142, completing a circuit to energize electromagnet 119 of valve 118 via conductors 143 and 144. Closing of switch 142 also energizes winding 145 of latch relay 121, via conductor 146, causing that relay to open. Opening of relay 121 de-energizes electromagnet 116, closing valve 115. Energization of electromagnet 119 opens valve 118, allowing air at atmospheric pressure to enter box 58 and so making certain that negative 8 will separate from the exposed positive film 7 when carrier 66 is raised.

Figure 13:
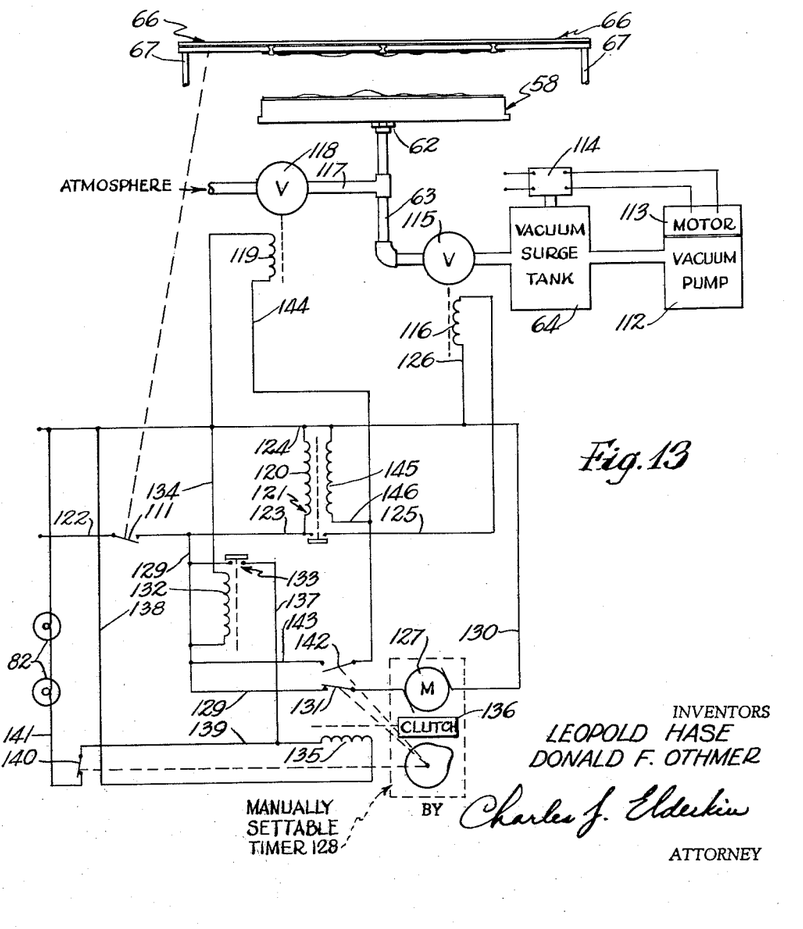
FIG. 13 is a schematic diagram of the vacuum system employed in the apparatus of FIG. 7.

Simultaneously with closing of switch 142, FIG. 13, timer 128 operates to close switch 147, FIG. 12, so completing a circuit to winding 148 of time delay relay 149 via conductors 150 and 151. After a predetermined delay period of, say, 5 seconds, time delay relay 149 closes, completing a circuit to winding 152 of latch relay 100, via conductors 151 and 153, so causing relay 100 to open. Opening of latch relay 100 de-energizes electromagnet 87, allowing pilot valve 86 to return to a position such that air under pressure is supplied to pneumatic motors 69 via conduit 89. Motors 69 thus operate to elevate the carrier 66. Exhaust air from motors 69 escapes, during most of the upstroke, via both the main exhaust valve 91 (electromagnet 110 being still energized) and cushioning valve 94.

Toward the end of the upstroke, a part of the support for carrier 66 engages switch 154, actuating the same mechanically to closed position. Via conductors 155 and 156 switch 154 completes a circuit to energize winding 157 of latch relay 107, actuating that relay to open position. Opening of relay 107 deenergizes electromagnet 110, allowing valve 91 to return to a position in which exhaust air from motors 69 can escape only through cushioning valve 94. Cushioning valve 94 allows only a reduced air flow, so that the terminal portion of the upstroke is at a desirably slow speed.

Carrier 66 now remains in its uppermost position until, after the operator has removed the exposed positive film 7 and placed an unexposed film on support 1, manual switch 95 is again closed to start a new cycle.

It will be understood that the position switches 98, 111, 154 can be mounted on any convenient part of the main frame of the apparatus. Advantageously, these switches are mounted at appropriate positions to be engaged by the cross-head 68, or by cams fixed either to the cross-head or to the shafts supporting carrier 66.

Since it avoids the necessity for projection in establishing the positive image, the invention permits use of a variety of light sources, including arc, quartz and ultra violet lamps providing light of greater intensity than can normally be used in projectors. Using such high intensity light sources, it is possible to employ "slow printing" photographic materials, such as diazotype materials, which are not practical when exposure is by projection.

While the invention has been described primarily with reference to three-dimensional negatives wherein the image has been produced photographically, it will be understood that the negative image can be established in any suitable conventional manner, as by art work or as a bas-relief.

While the apparatus embodiments described herein to illustrate the invention are advantageous, it will be understood that various changes in the apparatus can be made without departing from the scope of the invention.

We claim:

1. A method for producing a photographic image in relief accurately representing a three-dimensional subject, comprising forming two three-dimensional photographic elements presenting complementary relief faces accurately representing the relief features of the subject, one of said elements presenting a negative image accurately representing the subject and the other of said elements being photosensitive; placing said elements in registry with said complementary relief faces directed toward and in contact with each other; evacuating air from between said relief faces and applying a positive fluid pressure to one of said elements thereby establishing uniform and intimate contact between said faces; photographically exposing said photosensitive element through said negative image to form a latent positive image on said photosensitive element; separating said elements, and developing said latent image to provide a finished positive photographic image accurately representing the subject in three dimensions.

2. A method for producing accurate three-dimensional photographic reproductions, comprising the steps of forming two complementary elements each presenting a relief face having the configuration of the three-dimensional subject to be reproduced, one of said faces bearing an accurate negative image of the subject and the other of said faces being photosensitive, one of said elements being porous and the other being substantially nonporous; placing said elements with said relief faces in contact with each other; evacuating air from between said relief faces via said porous element while maintaining a positive pressure on the other of said elements, and thereby forcing said faces into intimate contact with each other; and photographically exposing said photosensitive face through said negative image while maintaining such intimate contact.

3. A method for producing accurate three-dimensional reproductions, comprising the steps of forming a porous positive element presenting a photosensitive face having the configuration of the three-dimensional subject to be reproduced, forming a complementary three-dimensional negative bearing the image to be reproduced, placing said negative on the photosensitive face of said porous element in registry therewith, evacuating the air from between said negative and said positive element via said porous positive element while maintaining positive pressure on said negative and thereby forcing said negative and said positive element into intimate face-to-face contact, and photographically exposing said photosensitive face through said negative while maintaining such intimate contact.

4. A method for producing accurate three-dimensional photographic reproductions, comprising the steps of forming a porous positive element presenting a photosensitive relief face having the configuration of the three-dimensional subject to be reproduced, forming a complementary three-dimensional negative bearing an accurate image of the subject, forming a porous support having a relief face complementary to said positive, placing said porous positive element on said relief face in registry therewith, placing said negative on said positive element in registry therewith, evacuating the air from between said negative and said positive element via said porous support and said porous positive element while maintaining positive pressure on said negative and thereby forcing said negative and said porous positive element into intimate face-to-face contact, and photographically exposing said positive element through said negative while maintaining such intimate contact.

5. A method for producing accurate three-dimensional photographic reproductions, comprising forming two complementary photographic elements each presenting a relief face having the configuration of the three-dimensional subject to be reproduced, one of said relief faces bearing a negative image of the subject and the other of said relief faces being photosensitive, one of said elements being flexible; disposing said elements within a fluid-tight chamber; evacuating said chamber; placing said elements together in registry with each other and with said faces in contact; providing a substantially fluid-tight seal between the edge portions of said elements; admitting fluid under pressure to said chamber and thereby forcing said faces into intimate contact with each other; and photographically exposing said photosensitive face through said negative image while maintaining such intimate contact.

6. A method for producing accurate three-dimensional photographic reproductions, comprising forming two complementary photographic elements each presenting a relief face having the configuration of the three-dimensional subject to be reproduced, one of said relief faces bearing a negative image of the subject and the other of said relief faces being photosensitive, one of said elements being flexible; forming a support presenting a supporting face having the configuration of the three-dimensional subject to be reproduced; placing said complementary elements and said support in a fluid-tight chamber; positioning one of said complementary elements on said support in relief registry therewith; evacuating said chamber; placing the other of said complementary elements on said one complementary element and thereby establishing an assembly comprising first said support and then said complementary elements in stacked relation with the relief configuration of said elements in registry; admitting fluid under pressure to said chamber and thereby forcing said faces into intimate contact with each other; and photographically exposing said photosensitive face through said negative image while maintaining such intimate contact.

7. A method for producing an accurate three-dimensional photographic reproduction of a three-dimensoinal subject, comprising forming two complementary molds, one presenting a male relief face having the configuration of the subject and the other presenting a female relief face having the same configuration, said one mold being porous; molding a first photographic film against said male relief face with emulsion to the mold and a second photographic film against said female relief face with emulsion to the mold; photographically establishing on said first film a negative image of the subject; placing said molded films together emulsion-to-emulsion in relief registry and placing the so-assembled films on said one mold as a support with the male relief surface of said one mold in contact with the non-emulsion side of said second film; evacuating air from between said films via said one porous mold, while maintaining a positive fluid pressure on the non-emulsion side of said first film, and thereby forcing the emulsion faces of said films into uniform intimate contact; photographically exposing said second film via said negative image; separating said films and developing said second film to obtain an accurate three-dimensional photographic image of the subject.

References Cited in the file of this patent
UNITED STATES PATENTS

| | | |
|---|---|---|
| 687,107 | D'Asar | Nov. 19, 1901 |
| 1,090,640 | Noetzel | May 12, 1914 |
| 2,064,068 | Koppe | Dec. 15, 1936 |
| 2,437,229 | Mears | Mar. 2, 1948 |
| 2,491,386 | Miller et al. | Dec. 13, 1949 |